Patented July 5, 1938

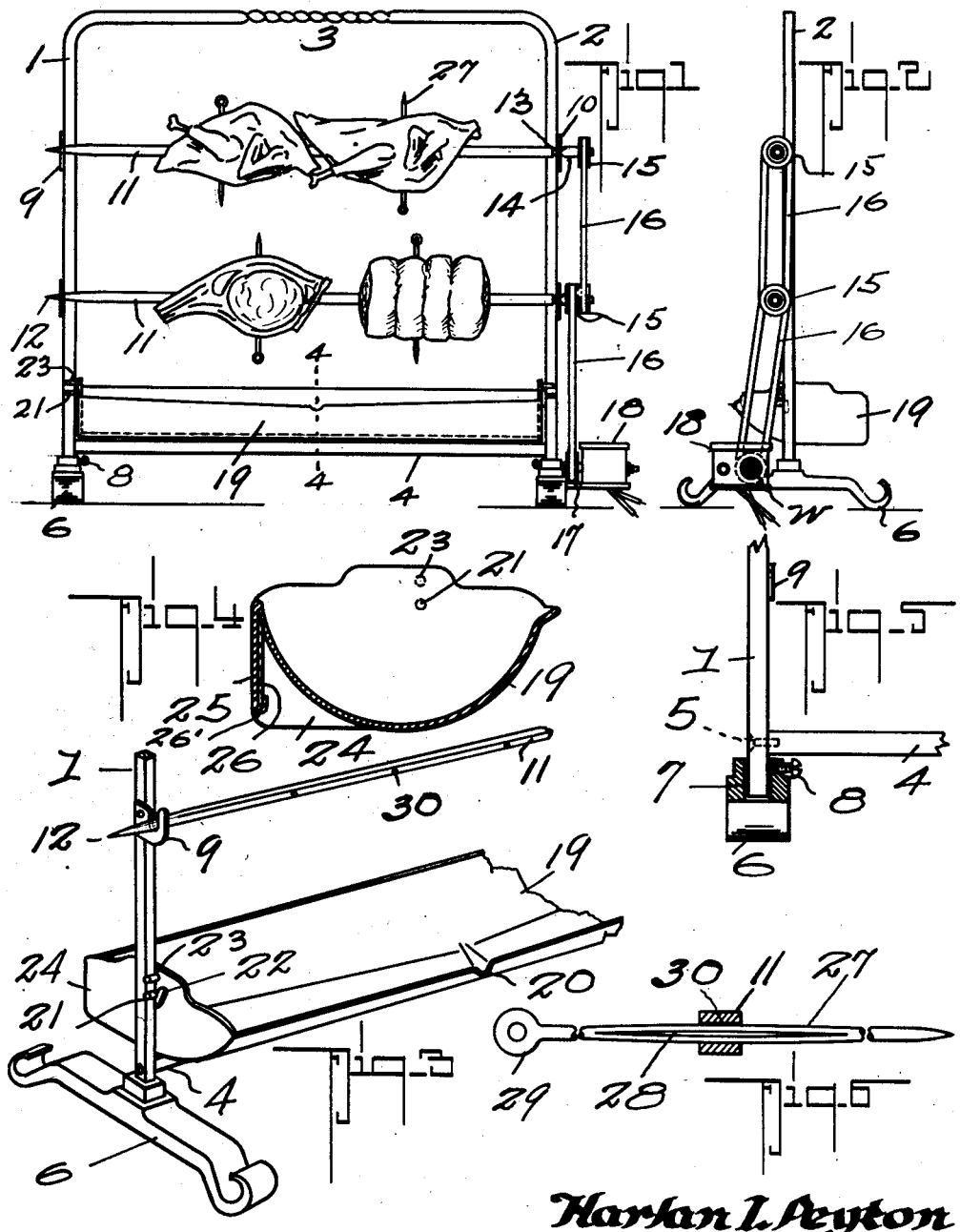

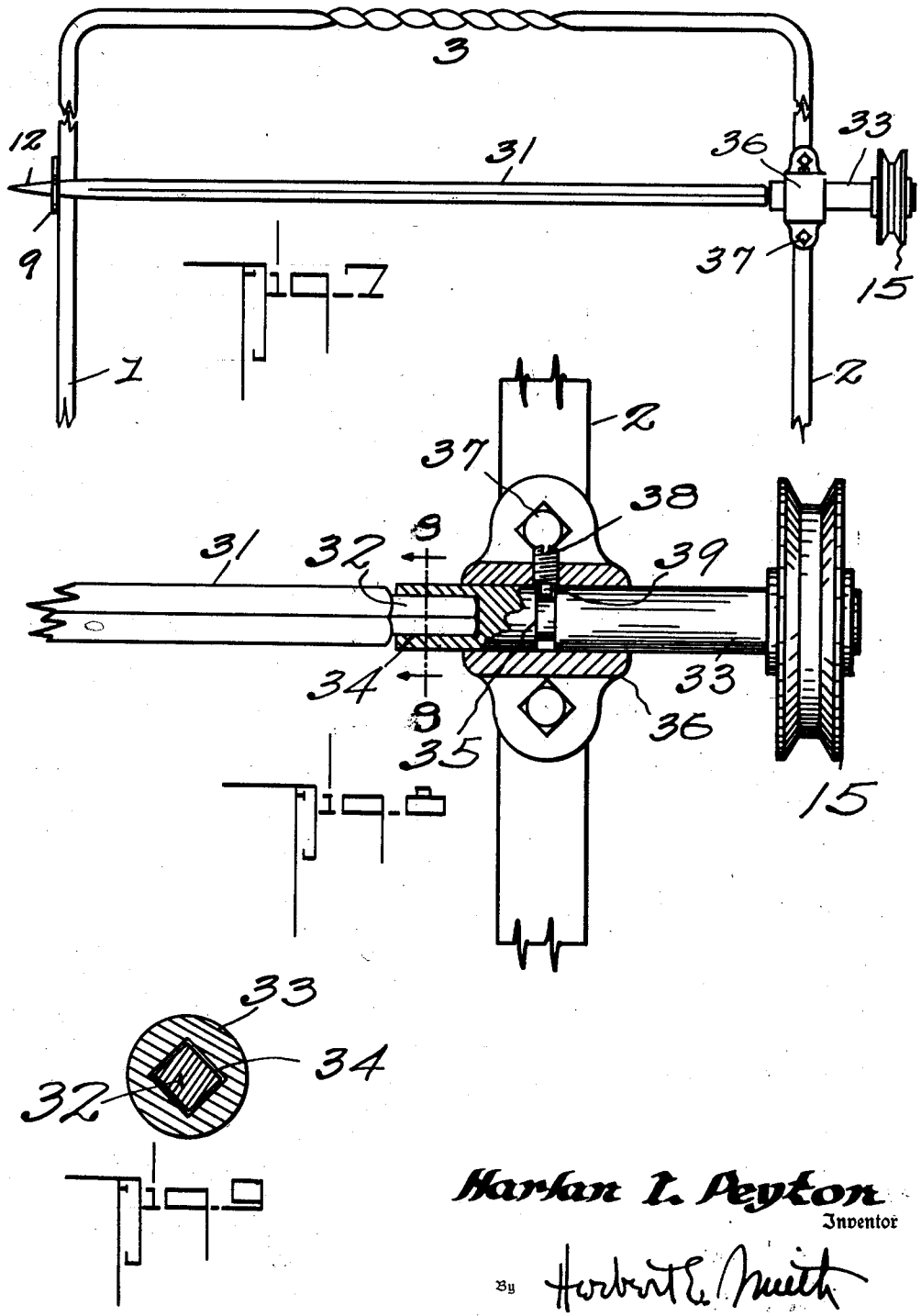

2,122,780

UNITED STATES PATENT OFFICE 2,122,780

ROTARY COOKING APPLIANCE

Harlan I. Peyton, Spokane, Wash.

Application June 16, 1937, Serial No. 148,605

7 Claims. (Cl. 53—5)

My present invention relates to an improved rotary cooking appliance of the rotisserie type, adapted for use with an open hearth or fireplace, and portable, and designed especially for broiling, roasting and baking meats, poultry and other foods. The invention involves a portable upright frame that is made up of separable parts that may be separated for transportation and storage purposes, and the appliance includes rotary spits or spit-bars for supporting the article or articles to be cooked together with means for rotating the spits or spit-bars. I preferably employ an electric motor forming part of the equipment for the appliance, which motor may readily be "plugged" in to a stationary outlet for the purpose of supplying power to the motor for rotating or revolving the spit-bars and the articles supported thereon.

By the utilization of the improvements in my invention an appliance of this type can be manufactured at comparatively low cost of production; the parts of the appliance may be assembled and the apparatus erected or installed for use in front of a suitable fire, or fire-place; and if necessary the parts may readily be separated and compactly stored in small compass for transportation or for storage purposes.

The invention consists in certain novel combinations and arrangements of parts as will hereinafter be more fully set forth and claimed. In the accompanying drawings I have illustrated a complete embodiment of my invention wherein the parts are combined and arranged in manner that has proven successful in operation, but it will be understood that changes and alterations may be made in these exemplifying drawings, within the scope of my appended claims, without departing from the principles of my invention.

Figure 1 is a view in elevation of a rotary cooking appliance or apparatus embodying my invention and showing the manner of supporting the foods to be cooked in front of an open fire-place or fire.

Figure 2 is an end view or an edge view of the appliance as seen from the right in Figure 1.

Figure 3 is a detail perspective view showing a portion of the supporting frame and a portion of the drip pan located beneath the foods that are to be cooked.

Figure 4 is an enlarged transverse sectional detail view of the drip pan removed from the frame, as at line 4—4 of Figure 1.

Figure 5 is a detail view in section showing a leg of the demountable frame in one of the supporting bases or foot-pieces.

Figure 6 is a sectional detail of one of the spit-bars showing a skewer therein.

Figure 7 is a view in elevation of part of the upright frame showing another form of the means for supporting the rotary spit-bars.

Figure 8 is an enlarged detail sectional view showing the journal arrangement of the spit-bar in Figure 7; and Figure 9 is an enlarged transverse sectional view at line 9—9 of Figure 8.

In carrying out my invention I employ a generally rectangular upright frame that includes an inverted U-shaped or arched member including the legs 1 and 2 and the upper cross bar 3 that may be twisted as indicated for ornamental purposes. A separable, bottom brace bar 4 is employed to add rigidity to the upright frame and the ends of this brace bar are secured near the lower ends of the legs 1 and 2 by means of screws 5. The upright frame is supported on two spaced bases or foot-pieces 6, 6 extending transversely of the frame, and each of these foot-pieces is fashioned with an upper socket 7, 7, to receive the lower ends of the legs, and the latter are fixed in place by means of set screws or bolts 8.

At suitable heights on the legs are fixed two sets or pairs of supporting hooks 9 and 10 that are adapted to receive and support two horizontally extending, rotary, spit-bars 11 each provided with the usual pointed end 12, and near the other ends of these spit-bars are provided annular grooves 13 that form journal bearings in connection with the open hooks 10, 10, said bearings being complementary to the use of the points 12 as journals for the other ends of the spit-bars. By means of the annular grooves which form the journal bearings, and in co-action with the hooks 10, 10, the spit-bars are held against longitudinal displacement from their bearing supports, and the ends 14 of the spitbars provide mountings for the sheaves, pulleys, or sprocket wheels 15 one of which is mounted on the upper spit-bar and two of which are mounted on the lower spit-bar. Belts or sprocket chains 16, 16 are employed to transmit rotary power from a drive wheel or pulley 17 which receives its power from an electric motor enclosed in a casing 18 that is supported on one of the foot pieces or bases of the frame, and the motor is supplied with the usual cord or cable and connecting plug in order that the motor may be "plugged in" to a suitable outlet as the source of electric current for operating the motor and thereby driving the rotary spit-bars 11, 11, the usual reduction gears being employed to provide a comparatively slow rotary motion of the spit-bars and the foods thereon. A window is indicated at W in the motor housing or casing, and a fan is usually employed within the casing for ventilating purposes.

Below the foods to be cooked a drip pan 19 is supported to catch drippings from the cooking foods, and the bottom of this pan, which is semi-circular in cross section declines from its ends toward the center to form a sump for collection of the gravy, juices etc. which latter may be picked up with a ladle and used for basting. The pan is tiltable toward the front so that its contents may be poured from a central pouring spout 20, and the pan is overbalanced toward the rear to prevent accidental front tilting of the pan. To provide this arrangement, the ends of the pan are provided with alined pivot pins 21 that are fixed in front of the transverse center of weight of the pan, and these pins are seated in supporting hooks 22 fixed at the inner sides of the upright legs 1 and 2. To prevent rearward tilting of the overbalanced pan, its ends are provided with stop pins 23 located slightly above the pivot pins, and these stop pins project across the front faces of the legs 1 and 2, as indicated in Figure 3. Thus it will be apparent that the pan may be tilted forward from its normal position by applied pressure, and when the pressure is released the pan automatically returns to its normal position.

As seen in Figures 4 and 5, the end walls 24 of the pan project to the rear or toward the fire-place or fire, from the semi-circular bottom of the pan, and the rear edges of these two end walls are connected by a vertically disposed apron 25 that extends longitudinally the full length of the pan, to perform the functions of a shield in preventing access of excessive heat to the semi-circular wall of the pan, which might otherwise burn the gravy collected in the bottom of the pan. As an auxiliary insulating element, a sheet of asbestos or other heat insulating material as 26 may be mounted between the apron and the bottom of the pan, and this sheet is retained by a turned up flange 26' at the bottom edge of the apron.

As indicated in Figure 1 the meats, poultry etc. to be broiled, baked, roasted, or otherwise cooked are affixed on the spit-bars by means of skewers 27, which, as shown in Figure 6 are longitudinally split as at 28 and slightly separated so that the resiliency of the material will insure close frictional engagement of the skewer with the spit-bar. The spit-bar is fashioned with holes 30 to receive the skewer, and the skewer has the usual eyelet 29 at one end to facilitate pulling it from the spit-bar.

In the journal arrangement of the rotary spit-bars 31 in Figures 7, 8 and 9, the pointed end 12 is journaled in the hook 9 on the leg 1, and the other end of the spit-bar is fashioned with an angular socket head 32 which is mounted in the alined stub shaft 33 which has an end socket 34 for the reception of the socket-head.

The stub shaft 33, on which the sheave or pulley 15 is mounted, is fashioned with an annular groove 39 similar to the annular grooves 13 of the spit-bars 11, and the shaft is journaled in a bearing 36 bolted at 37 to the leg 2 of the frame.

As a means co-acting with the annular groove to prevent longitudinal displacement of the spit-bar, a screw 38 is threaded in an opening of the bearing 36, and this screw has a reduced end or pin 39 that projects into the annular groove. The supporting bearing 36, like the hooks 9, is a fixture on the leg 2, but the spit-bar 31, and also the stub shaft 33 may readily be removed when desired or necessary. The spit-bar may with convenience be withdrawn from the socket of the stub-shaft for the purpose of piercing or impaling the meat to be cooked, and of course the pointed end of the spit-bar 31 is readily removed from its bearing hook 9. After the meat has been impaled and the skewer used to fix the meat on the spit-bar, the latter may readily be joined with the stub shaft and supporting in the bearing-hook 9 for rotation of the meat during its cooking, baking, broiling, or roasting process.

Having thus fully described my invention, what I claim as new and desire to secure by Letters Patent is:—

1. In a rotary cooking appliance, the combination with an upright frame and spaced bearing-hooks on said frame, of a removable drip-pan having end pivot-pins supported in the bearing-hooks, said pan being over-weighted at its rear, and co-acting means on the pan and frame to prevent over-turning of the pan on its pivot pins.

2. In a rotary cooking appliance, the combination with an upright frame including spaced legs and bearing hooks mounted on said legs, of a tiltable pan having end pivot-pins alined on an axis forward of the longitudinal axis of the pan, said pins being supported in the bearing hooks, and co-acting means on the pan and leg to prevent rearward overturning of the pan.

3. In a rotary cooking appliance, the combination with an upright frame and spaced bearing hooks thereon, of a drip-pan having a bottom declining from its ends toward its center and a central pouring spout on the pan, end pivot-pins on the pan and supported in said hooks, said pins being alined on an axis in front of the longitudinal axis of the pan, and a stop-pin on the pan for co-action with the frame to prevent rearward tilting of the pan.

4. In a rotary cooking appliance for use with an open fire-place, the combination with an upright frame having spaced supporting hooks, of a drip-pan semi-circular in cross section and provided with rearwardly projecting end walls, a longitudinally extending vertically disposed apron joining said end walls at the rear of the pan, pivot pins mounted on said end walls and offset from the longitudinal axis of the pan, said pins mounted in said bearing hooks, and a stop pin mounted on the pan for co-acting with the frame to prevent accidental rearward tilting of the pan.

5. In a rotary cooking appliance for use with an open fire-place, the combination with an upright frame having laterally spaced bearing supports, a spit-bar journaled in one of the supports, an alined stud-shaft journaled in the other support, said stud shaft having an annular groove, a screw in the second support having a pin-head engaged in said groove, an angular socket-head on the spit-bar engaged in a complementary socket in an end of the shaft, and means for revolving the shaft.

6. In a rotary cooking appliance for use with an open fire-place, the combination with a generally rectangular upright frame comprising an inverted U-shaped member forming a handle across the top of the frame and upright legs, a bottom brace joining the legs, foot pieces extending transversely of the frame formed with sockets to receive the lower ends of the legs, fixed bearing supports upon the legs, a spit bar rotatably mounted in said supports and means for rotating the spit bar.

7. In a rotary cooking appliance for use with an open fire-place, the combination with a frame comprising a pair of spaced upright supports, an arch bar across the top of said supports forming a handle therewith, a bottom brace joining the uprights near their lower ends, separable foot pieces extending transversely of the frame and provided with sockets to receive the lower ends of the uprights, a series of spaced bearing supports on the uprights, spit bars rotatably mounted in one or more of said supports, means for rotating the spit bars, and a drip pan supported in the lowermost bearing supports.

HARLAN I. PEYTON.